(12) United States Patent
Hashizume

(10) Patent No.: US 7,715,136 B2
(45) Date of Patent: May 11, 2010

(54) HARD DISK DRIVE PREAMPLIFIER WITH REDUCED PIN COUNT

(75) Inventor: Motomu Hashizume, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 420 days.

(21) Appl. No.: 11/733,027

(22) Filed: Apr. 9, 2007

(65) Prior Publication Data

US 2007/0236819 A1    Oct. 11, 2007

Related U.S. Application Data

(60) Provisional application No. 60/744,609, filed on Apr. 11, 2006.

(51) Int. Cl.
*G11B 5/09* (2006.01)

(52) U.S. Cl. .......................... 360/46; 360/66
(58) Field of Classification Search ................ None
See application file for complete search history.

(56) References Cited

U.S. PATENT DOCUMENTS

| | | | |
|---|---|---|---|
| 5,898,303 A | 4/1999 | Umanskiy et al. | |
| 6,424,476 B1 | 7/2002 | Matsubara et al. | |
| 6,462,897 B1* | 10/2002 | Yamamoto | 360/66 |
| 2002/0001149 A1* | 1/2002 | Narusawa et al. | 360/46 |
| 2006/0193071 A1 | 8/2006 | Choi et al. | |

* cited by examiner

*Primary Examiner*—Jason C Olson
(74) *Attorney, Agent, or Firm*—Dawn V. Stephens; Wade James Brady, III; Frederick J. Telecky, Jr.

(57) ABSTRACT

A disk drive controller including a preamplifier and a controller is disclosed, in which communications between the controller and the preamplifier are carried out over at least some shared terminals and conductors. A first pair of differential lines is provided to communicate data, sensed at read/write heads of the disk drive, from the preamplifier to the controller, and a second pair of differential lines communicates data to be written to the disk drive from the controller to the preamplifier. Control signals are communicated over a serial interface between the controller and preamplifier, over the first pair of differential lines, so that serial communication can be carried out simultaneously with the writing of data from the controller to the preamplifier. Alternatively, the control signals are communicated over the second pair of differential lines, simultaneously with the reading of data from the preamplifier to the controller.

16 Claims, 6 Drawing Sheets

HARD DISK DRIVE PREAMPLIFIER WITH REDUCED PIN COUNT

CROSS-REFERENCE TO RELATED APPLICATIONS

This application claims priority, under 35 U.S.C. §119(e), of Provisional Application No. 60/744,609, filed Apr. 11, 2006, incorporated herein by this reference.

STATEMENT REGARDING FEDERALLY SPONSORED RESEARCH OR DEVELOPMENT

Not applicable.

BACKGROUND OF THE INVENTION

This invention is in the field of preamplifier circuits for hard disk drives, and is more specifically directed to the mechanical interface for such preamplifiers.

Magnetic disk drive technology is the predominant mass non-volatile storage technology in modern personal computer systems, and continues to be an important storage technology for mass storage applications in other devices, such as portable digital audio players. As is fundamental in the field of magnetic disk drives, data is written by magnetizing a location ("domain") of a layer of ferromagnetic material disposed at the surface of a disk platter. Each magnetized domain forms a magnetic dipole, with the stored data value corresponding to the orientation of that dipole. The "writing" of a data bit to a domain is typically accomplished by applying a current to a small electromagnet coil disposed physically near the magnetic disk, with the polarity of the current through the coil determining the orientation of the induced magnetic dipole, and thus the data state written to the disk. In modern disk drives, a magneto-resistive element is used to sense the orientation of the magnetic dipole at selected locations of the disk surface, thus reading the stored data state. Typically, the write coil and the magneto-resistive element are physically placed within a read/write "head".

Data communication to and from the read/write heads in a modern disk drive system is carried out by way of a disk drive controller. Years ago, these disk drive controllers were generally implemented as a separate card within a computer system, given the substantial circuitry required to carry out such functions as mapping logical addresses to physical addresses, servo control of the spindle motor that rotates the disks and of the voice coil motor that positions the read/write heads at the desired location of the disk surface, and the like. Significant advances have been made in recent years both to greatly increase the density of data stored per unit area of the magnetic disk surface, and also to miniaturize the disk drive controller circuitry. Indeed, modern miniaturized hard disk drive systems, such as used in modern personal computers and notebook computers, and also as used in small-scale systems such as digital audio players, have placed the disk drive controller functionality at the disk drive itself, with some circuit functions even being moved out to the actuator arm.

A typical architecture of a conventional disk drive controller includes a processor or main controller circuit, for example implemented as a digital signal processor (DSP) or other programmable processor, along with the appropriate memory resources, for controlling the operation of the disk drive system, including such functions as address mapping, error correction coding and decoding, and the like. This controller is in bidirectional communication with a preamplifier function, which includes preamplifier circuitry for generating an electrical signal based on variations in the resistance of a magnetoresistive read heads, and which also includes write driver circuitry for generating write current applied to the inductive write heads. Other ancillary circuitry is also included in the preamplifier function, including circuitry for applying a DC bias to the magnetoresistive read head, fly height control circuitry for controllably heating the read/write head assemblies to maintain a constant fly height, as known in the art.

As such, data and control communication is required between the main controller and the preamplifier. FIG. 1 illustrates an example of a conventional architecture including controller 2 and preamplifier 4. In this example, preamplifier 4 includes amplifier 7, which is connected to magnetoresistive read head 3, and write driver 9, which is connected to inductive write head 5; these connections occupy four external terminals of preamplifier 4, as shown. Typically, conventional preamplifiers 4 communicate with multiple read/write heads in the disk drive system (e.g., as many as eight read/write heads), in which case multiple groups of external terminals will be provided, for example as illustrated for read/write circuitry 12 of preamplifier 4, serving another read/write head k. Three terminals of preamplifier 4 are also required for the power supply connections, in this case including the $V_{cc}$ and $V_{ee}$ power supply voltages, and a ground connection, each of which are sourced through controller 2, as shown in FIG. 1. Various termination resistors are included within controller 2 and preamplifier 4, as conventional in the art and as shown in FIG. 1.

Preamplifier 4 includes conventional functions, such as data driver 11, data receiver 13, serial interface 10, and fault/buffered head voltage (BHV) circuit 8. Via a pair of external terminals, data driver 11 drives differential signal lines RDX, RDY that are connected to controller 2. Differential signal lines RDX, RDY communicate, to controller 2, data read from the disk drive via read head 3, amplifier 7, and other circuitry within preamplifier 4. Conversely, data receiver 13 receives a differential signal, at a pair of external terminals, from differential signal lines WDX, WDY, which are driven by controller 2. Differential signal lines WDX, WDY thus communicate, to preamplifier 4, data to be written to the disk drive via write head 5. Preamplifier 4 also receives at, an external terminal, a control signal from line R/xW indicating whether a read or a write operation is requested by controller 2. Head select and other control information is communicated by controller 2 over serial data line SDAT, serial clock line SCLK, and serial data enable line SDEN, to serial interface 10 of preamplifier 4. Fault/BHV circuitry 8 of preamplifier 4 issues fault signals, and also presents an analog signal indicative of the buffered head voltage (BHV) of a selected read head 3 when placed in a BHV sense mode by control information received by serial interface 10. These fault and BHV signals are communicated over signal line FLT&BHV, which occupies another external terminal of preamplifier 4.

FIGS. 2a and 2b illustrate the operation of controller 2 and preamplifier 4 in communicating with one another over the interface illustrated in FIG. 1, for this conventional architecture, over a sequence of operations. Between time $t_0$ and time $t_1$ of FIG. 2a, preamplifier 4 is in a "sleep", or "idle", state, in which no data is being written to or read from preamplifier 4 by controller 2. Just prior to time $t_1$, controller 2 asserts serial data enable signal SDEN. During the active high level of this signal, controller 2 issues serial data to preamplifier 4 on serial data line SDAT, in combination with cycles of serial clock signal SCLK (not shown). It is contemplated that, given the serial nature of this communication, multiple data values will be communicated during the active duration of serial data line SDAT; such multiple data values are not specifically shown in FIG. 2a, for the sake of clarity. In this example, the serial data communicated in cycle n includes control data to cause preamplifier 4 to enter data read/write operations, with the direction of data indicated by the state of read/write signal line R/xW, and with other control information communicated over serial data line SDAT in cycle n. Controller 2 then de-asserts serial data enable signal line SDEN.

In the example illustrated in FIG. 2a, a read operation begins at time $t_1$, because controller 2 has asserted signal line R/xW to an active high level, indicating a data read operation. During this read, differential data signals will be driven by preamplifier 4 onto lines RDX, RDY (not shown in FIG. 2a), for communication of data read via a selected read head 3, to controller 2. But, as shown in FIG. 1, because the data lines RDX, RDY are separate from the serial signal lines SDEN, SCLK, SDAT, serial communication between controller 2 and preamplifier 4 can be carried out simultaneously and in parallel with the communication of read data on lines RDX, RDY. This simultaneous serial communication is indicated in FIG. 2a by the dashed active periods on lines SDEN, SDAT between time $t_1$ and time $t_2$.

A data write operation then begins, as indicated by the high-to-low transition of signal line R/xW driven by controller 2 just prior to time $t_2$. During this write operation, controller 2 will issue data on lines WDX, WDY, in the form of differential signals, corresponding to data to be written to the disk surface by the write head associated with the read head from which data was read in the previous operation, in this example. As in the read operation, serial data may be communicated simultaneously with the write data transfer to serial interface 10, over signal lines SCLK, SDEN, SDAT, as indicated by the dashed active periods on lines SDEN, SDAT shown in FIG. 2b. Near the end of this operation, prior to time $t_3$ in this example, this serial communication includes the selection of a different read/write head for the next operation, along with other control information, as evident from the active period shown for serial data enable line SDEN and the serial data information on line SDAT illustrated in FIG. 2b, both driven by controller 2; as before, serial clock line SCLK is driven by controller 2 with a clock signal that synchronizes the serial data transfer into serial interface 10. In this example, this control information can include selection of a different read head from that in the previous operation. Also at about time $t_3$, controller 2 asserts signal line R/xW to a high active level, indicating that the next operation is a data read.

Following time $t_3$, and during the data read operation, controller 2 initiates control information that will place preamplifier 4 into an idle state, because of the absence of data to be written or disk locations to be read, and to save power. This is accomplished by controller 2 asserting serial data enable line SDEN in combination with source serial control data requesting the idle operation on line SDAT and corresponding cycles of serial clock SCLK (not shown). Upon completion of this serial communication, at time $t_4$, preamplifier 4 enters the idle mode again.

FIG. 2b illustrates the operation of preamplifier 4 and controller 2 in an example of operation in which preamplifier 4 issues a fault signal to controller 2. In this example, the fault is detected by preamplifier 4 after time $t_3$, during the read operation, with preamplifier 4 driving line FLT&BHV to an active high level. In response to this fault signal, controller 2 issues a high active signal on line SDEN, and serially communicates control information to preamplifier 4 on serial data line SDAT, with the control information including such information useful in clearing or investigating the reason for the fault signal, and also control information responding to the fault.

As evident from FIG. 1, conventional preamplifier 4 requires twelve external terminals beyond those required for communicating with the read/write heads. While the number of terminals for communication with read/write heads will tend to dominate the pinout of preamplifier 4, the physical interface between preamplifier 4 and controller 2 is highly constrained in modern small form factor hard disk drives, especially considering the width of conductors required to run to preamplifier 4 for power supply voltages $V_{cc}$, $V_{ee}$, and ground.

By way of further background, U.S. Patent Application Publication No. US 2006/0193071 A1, entitled "HIDID Preamp-to-Host Interface with Much Reduced I/O Lines", commonly assigned with this application and incorporated herein by reference, describes an approach to combining the functions of the terminals for the signal lines between a preamplifier and a controller in a disk drive system. According to this publication, two terminals are used for the read signals (RDX, RDY), write signals (WDX, WDY), and also for the serial communication (SCLK, SDAT), depending on the mode selected.

BRIEF SUMMARY OF THE INVENTION

It is therefore an object of this invention to provide a preamplifier architecture in which data communications between the preamplifier and the controller in a disk drive controller can be carried out over relatively few signal lines and terminals.

It is a further object of this invention to provide such a preamplifier architecture that still permits serial control communication in parallel with data communication between the controller and the preamplifier.

It is a further object of this invention to provide such a preamplifier architecture in which certain control functions share a common terminal, for communication with the controller.

Other objects and advantages of this invention will be apparent to those of ordinary skill in the art having reference to the following specification together with its drawings.

The present invention may be implemented into a preamplifier integrated circuit for a disk drive controller in which a serial interface is connected to, and shares, the same terminals as either the read data or write data terminals, but not both. In this manner, serial data communication can occur simultaneously with read or write operations. The invention may also be implemented so that fault circuitry and the serial interface share a terminal.

DETAILED DESCRIPTION OF THE INVENTION

The present invention will be described in connection with its preferred embodiment, namely as implemented into a hard disk drive system. However, it is contemplated that this invention may also be beneficial in other systems and applications. Accordingly, it is to be understood that the following description is provided by way of example only, and is not intended to limit the true scope of this invention as claimed.

Figure 3:
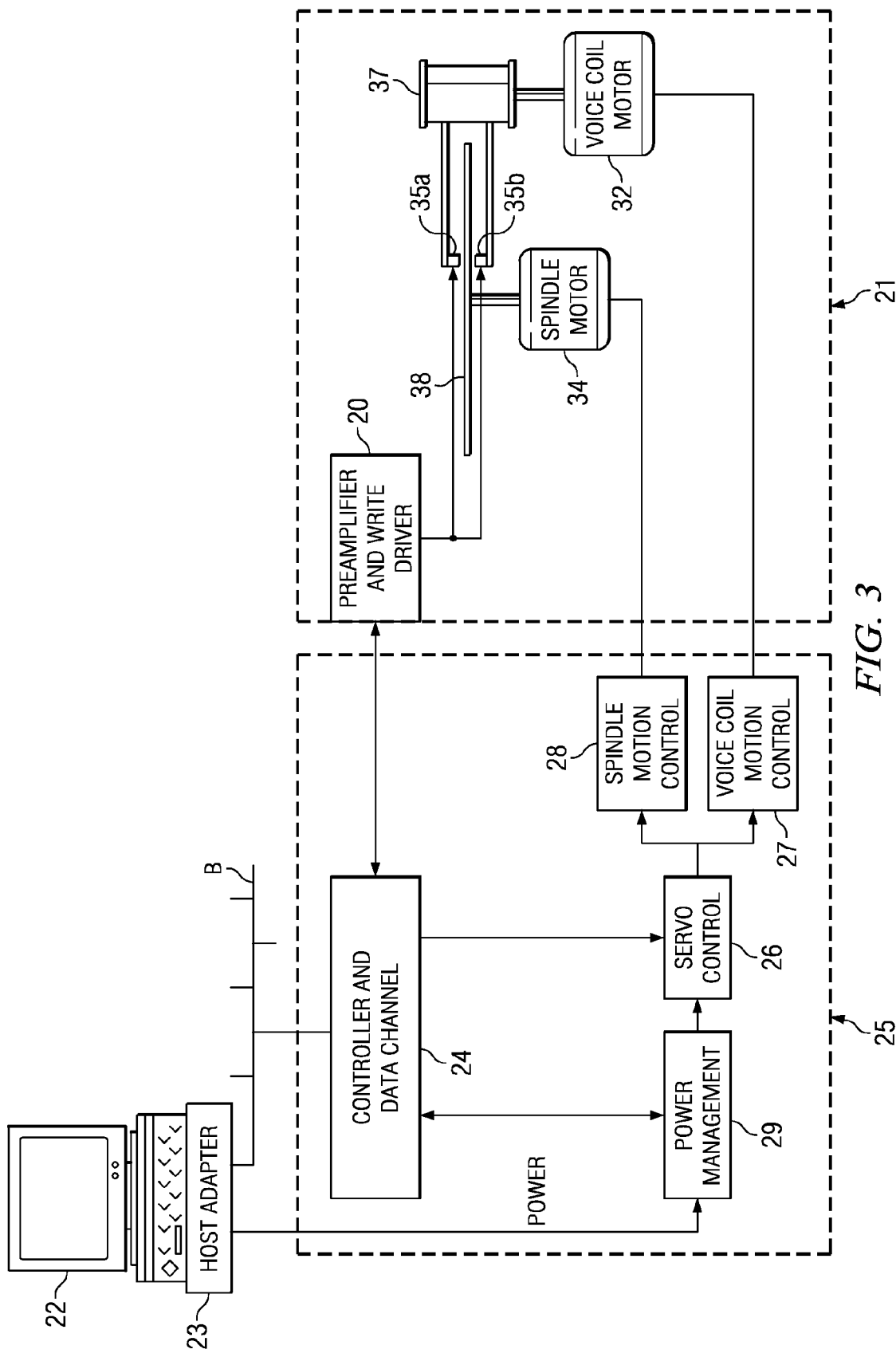
FIG. 3 is an electrical diagram, in block form, of a disk drive system constructed according to the preferred embodiments of the invention.

FIG. 3 illustrates an example of a computer including a disk drive system, into which the preferred embodiment of the invention is implemented. In this example, personal computer or workstation 22 is realized in the conventional manner, including the appropriate central processing unit (CPU), random access memory (RAM), video and sound cards or functionality, network interface capability, and the like. Also contained within computer 22 is host adapter 23, which connects on one side to the system bus of computer 22, and on the other side to bus B, to which disk drive controller 27 is connected. Bus B is preferably implemented according to conventional standards, examples of which include the Enhanced Integrated Drive Electronics (EIDE) standard or the Small Computer System Interface (SCSI) standard. Other disk storage devices (hard disk controllers, floppy drive controllers, etc.) and other peripherals may also be connected to bus B, as desired and in the conventional manner. Alternatively, system 22 may be a smaller-scale system, such as a portable digital audio player or the like.

Disk drive controller 25, in this example, corresponds to a disk drive controller architecture in which the drive electronics are physically implemented at the disk drive, rather than as a controller board within computer 22 itself. Of course, in larger scale systems, controller 25 may be implemented within computer 22. In the generalized block diagram of FIG. 1, controller 25 includes several integrated circuits, including data channel 4 in the data path between computer 22 and the medium itself. Disk drive controller 25 also includes controller 24, which is preferably implemented as a digital signal processor (DSP) or other programmable processor, along with the appropriate memory resources (not shown), which typically include some or all of read-only memory (ROM), random access memory (RAM), and other non-volatile storage such as flash memory. Controller 24 controls the operation of the disk drive system, including such functions as address mapping, error correction coding and decoding, and the like, and also includes the data channel through which data is read from and written to the hard disk drive. Interface circuitry coupled between bus B and controller 24, and other custom logic circuitry including clock generation circuits and the like also may be included within disk drive controller 25.

Head-disk assembly 21 of the disk drive system includes the electronic and mechanical components that are involved in the writing and reading of magnetically stored data. In this example, head-disk assembly 21 includes one or more disks 38 having ferromagnetic surfaces (preferably on both sides) that spin about their axis under the control of spindle motor 34. Multiple read/write head assemblies 35a, 35b are movable by actuator arm 37, and are coupled to preamplifier and write driver function 20. On the read side, preamplifier and write driver function 20 receives sensed currents from read/write head assemblies 35a, 35b in disk read operations, and amplifies and forwards signals corresponding to these sensed currents to controller 24 in disk drive controller 25. On the write side, write driver circuitry within preamplifier and write driver function receives data to be written to a particular location of disk 38 from data channel in controller 24, and converts these data to the appropriate signals for writing to disk 38 via read/write head assemblies 35a, 35b. Other circuit functions may also be included within the functional block labeled preamplifier and write driver function 20, including circuitry for applying a DC bias to the magnetoresistive read head in read/write head assemblies 35a, 35b, and also fly height control circuitry for controllably heating read/write head assemblies 35a, 35b to maintain a constant fly height, as described in U.S. Patent Application Publication No. US 2005/0105204 A1, published May 19, 2005 based on an application by Bloodworth et al., assigned to Texas Instruments Incorporated and incorporated herein by reference.

Figure 1:
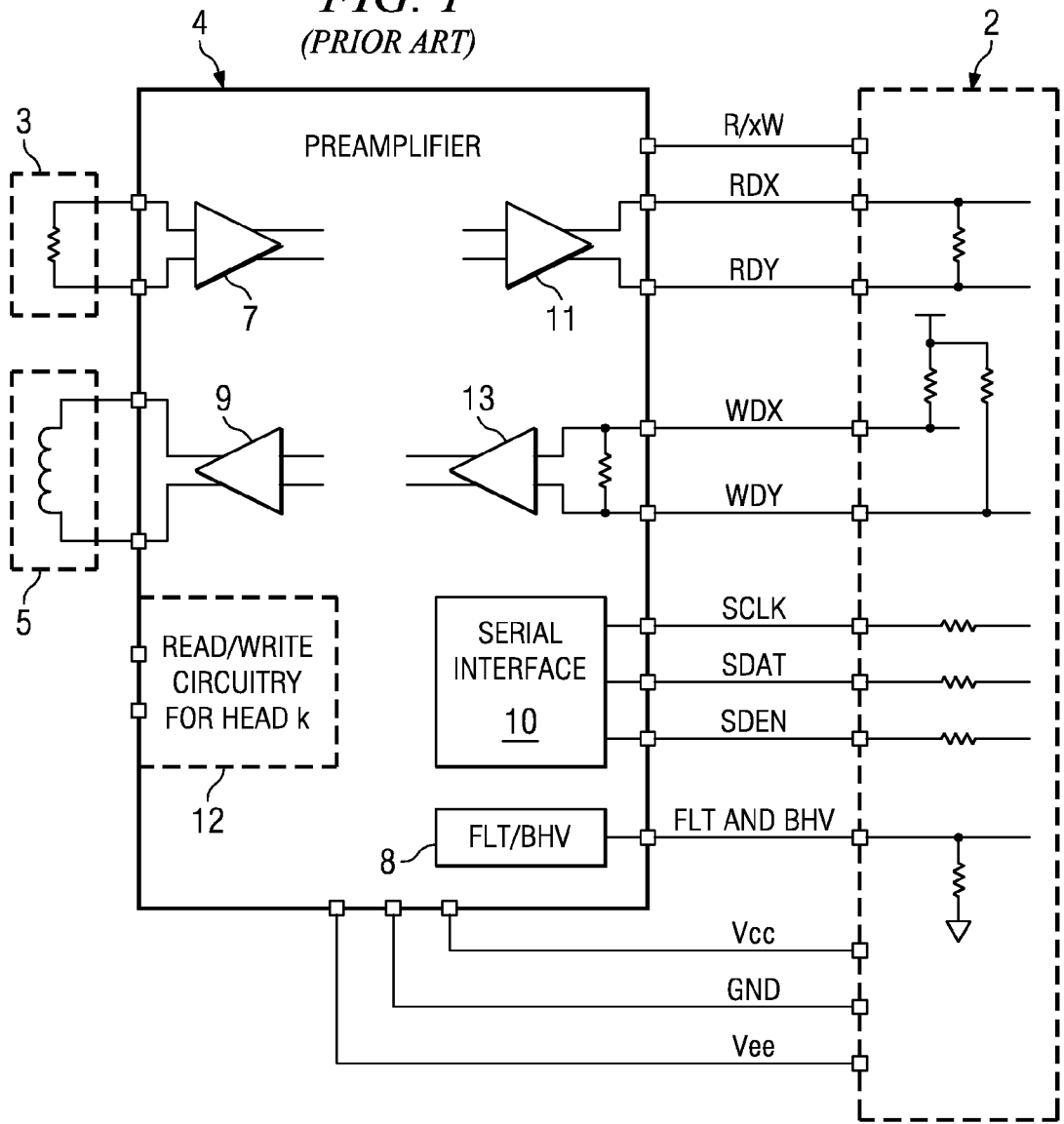
FIG. 1 is an electrical diagram, in block form, illustrating a conventional arrangement of a preamplifier in a disk drive controller architecture.
Figure 2A:
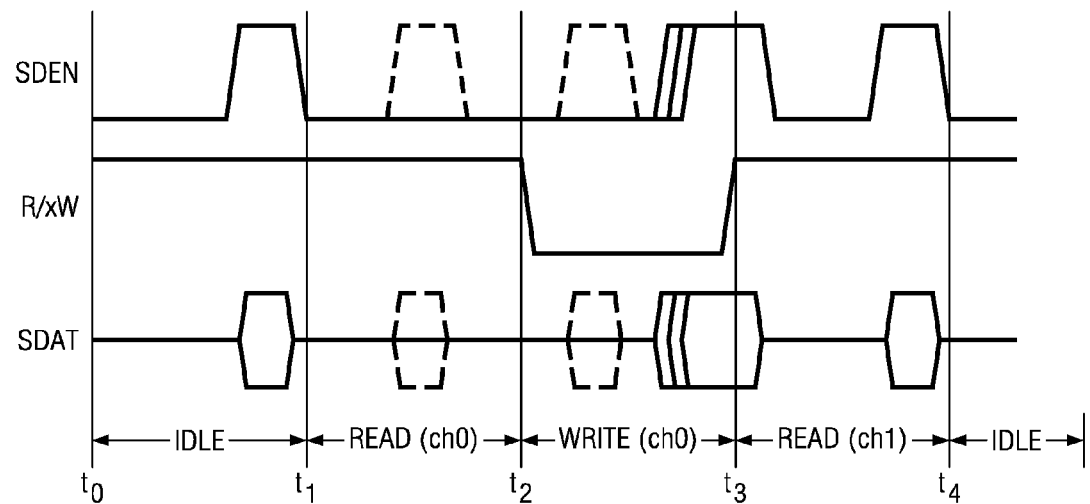
FIGS. 2a and 2b are timing diagrams illustrating the operation of the conventional architecture of FIG. 1.
Figure 2B:
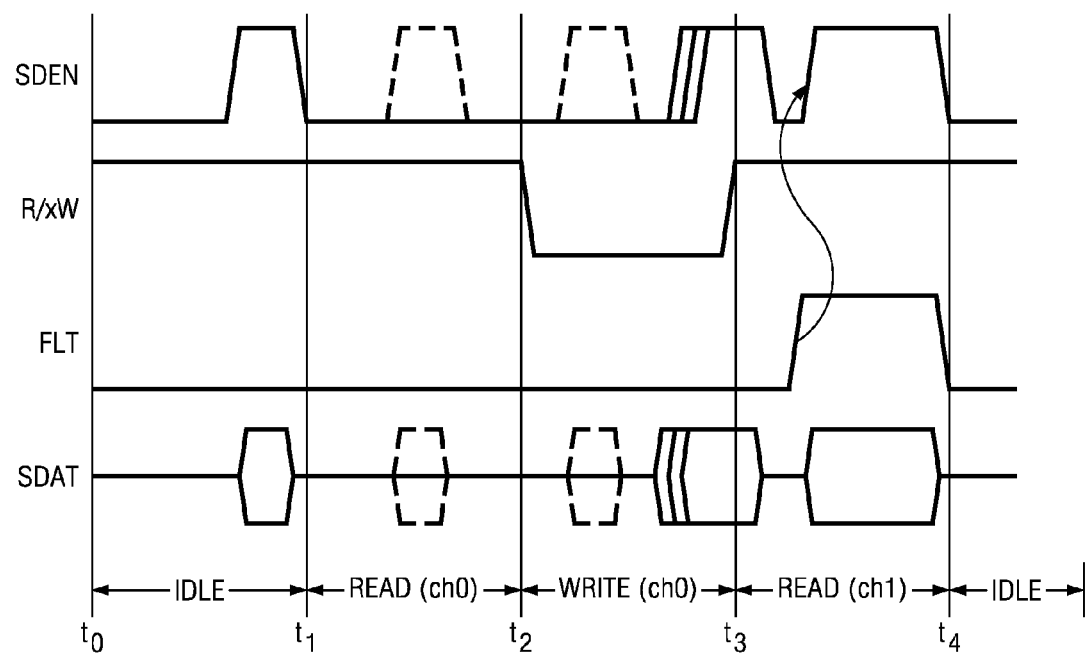

In this example, disk drive controller 24 also includes servo control 26, which communicates with spindle motion control function 28 and voice coil motion control function 27. Spindle motion control function 28 drives spindle motor 34 in head-disk assembly 21 according to control signals from servo control 26, while voice coil motion control function 27 drives voice coil motor 32 according to such control signals. As known in the art, spindle motor 34 spins disks 38 about their axis, and voice coil motor 32 controls the radial position of actuator arm 37 at disks 38. In this manner, spindle motor 34 and voice coil motor 32 place the read/write head assemblies 35a, 35b at the desired locations of disk surface 38, according to an address value communicated by controller 24, so that the data may be written to or read from the appropriate physical location of disks 38. Power management function 29 receives power from computer 22 on line PWR as shown in FIG. 1; and includes one or more voltage regulators by way of which it generates and controls various voltages within disk drive controller 25 and also within head-disk assembly 21. The functions of servo control 26, spindle motion control 28, power management function 29, and voice coil motion control 27 may be integrated into a single integrated circuit, for miniaturization of the disk drive system and to reduce the manufacturing cost.

Figure 4:
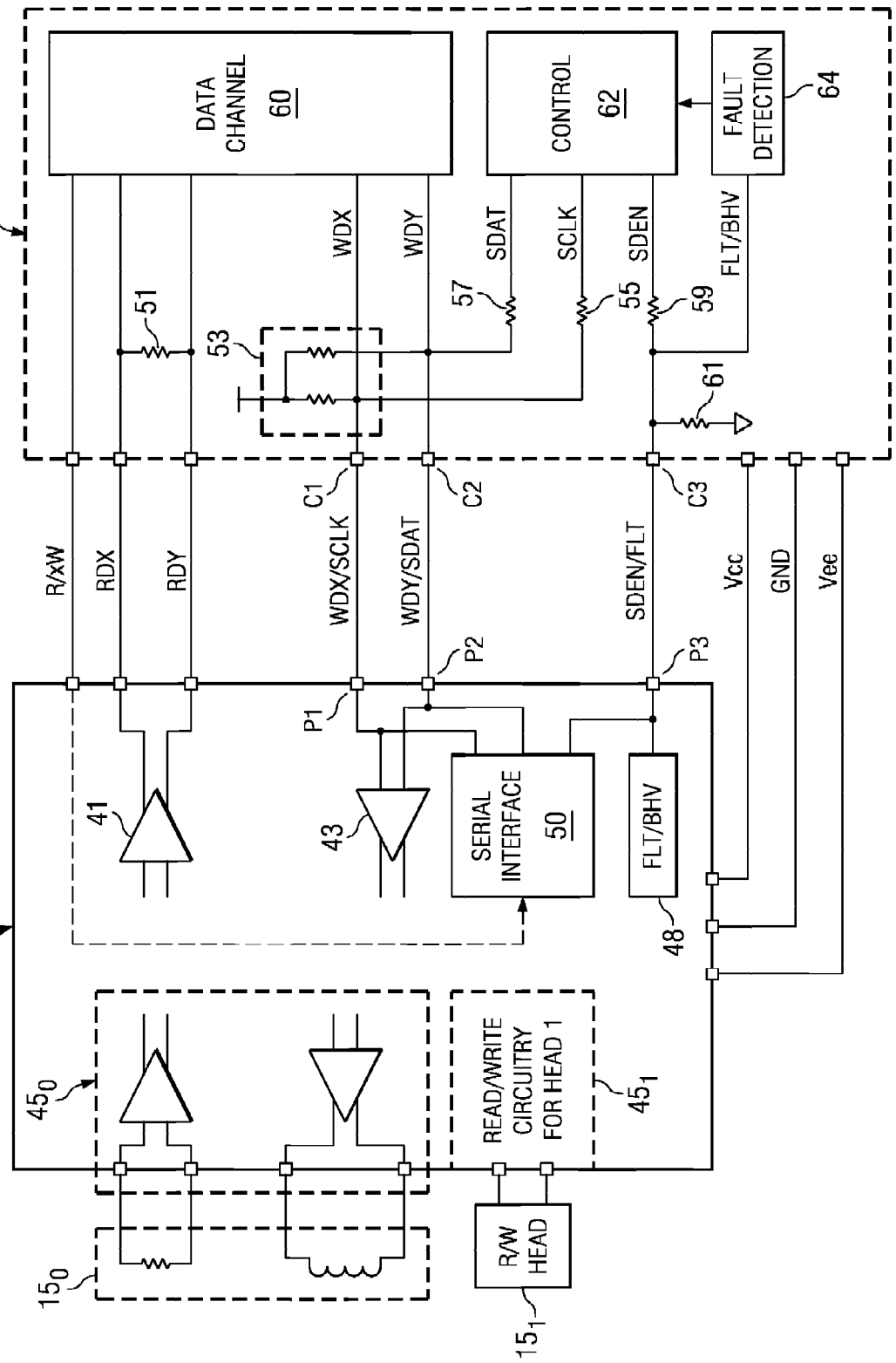
FIG. 4 is an electrical diagram, in block form, of a preamplifier constructed according to a first preferred embodiment of the invention, as connected in a disk drive controller architecture.

Referring now to FIG. 4, the construction of preamplifier 20, and its connection to controller 24, according to a first preferred embodiment of this invention will now be described. In this example, preamplifier 20 includes two instances of read/write circuitry $45_0$, $45_1$, one for each instance of read/write heads $15_0$, $15_1$. As conventional, each instance of read/write circuitry 45 includes the appropriate amplifier for sensing and amplifying the resistance of the magnetoresistive read head, and for driving a current to the inductive write head, or alternatively such other circuitry for sensing and driving signals for the corresponding read and write head mechanism. Preamplifier 20 also includes data driver 41 for driving lines RDX, RDY with differential signals corresponding to data read by a selected one of read/write heads 15, and data receiver 43 for receiving, from lines WDX, WDY, differential signals indicative of data to be written by a selected one of read/write heads 15. Preamplifier 20 also includes serial interface 50, for receiving and processing address, head selection, and other control information, and fault/BHV circuitry 48, for generating fault signals and for forwarding a signal corresponding to the buffered head voltage, when requested by controller 20. Control circuitry (not shown) within preamplifier 20 also receives the control signal on line R/xW that indicates whether controller 24 is writing data to, or reading data from, preamplifier 20. In this embodiment of the invention, preamplifier 20 is realized in a single integrated circuit (together with such other functions as fly height control and the like), but that is separate from the integrated circuit within which controller 24 is realized. The physical distance (i.e., conductor length) between preamplifier 20 and controller 24 will depend on the form factor of the disk drive system and other constraints.

Controller 24 includes certain conventional functions, such as data channel 60, controller circuit 62, and fault detection circuit 64. In general, data channel 60 manages the communication of data to be written to and read from the disk drive, and as such drives and senses the differential signals to data receiver 43 and from data driver 41, respectively, of preamplifier 20. Controller circuit 62 generates and communicates head selection and other control information to serial interface 50 of preamplifier 20, and fault detection circuit 64 receives fault signals from FLT/BHV circuit 48 of preamplifier 20.

According to this first preferred embodiment of this invention, the interconnection of preamplifier 20 to controller 24 is arranged to reduce the number of external terminals ("pins") required of preamplifier 20, by sharing the serial interface between preamplifier 20 and controller 24 with the write data channel between these devices. In this embodiment of the invention, the unshared connections include read/write signal line R/xW, which is a dedicated connection between controller 24 and preamplifier 20, and also differential read signal lines RDX, RDY, which are connected between dedicated terminals of preamplifier 20 and controller 24; resistor 51 is connected between read signal lines RDX, RDY within controller 24, or externally thereto if desired, in the conventional manner.

The sharing of the write data channel and the serial interface, according to this embodiment of the invention, is effected by the connection of terminals P1 and P2 of preamplifier 20 to both the differential inputs of data receiver 43, and also to serial interface 50. As such, the signal line connected to terminal P1 serves one of the differential write data lines (line WDX in this example), and also one of the serial interface lines (line SCLK in this example). Terminal P2 serves the other differential write data line (line WDY in this example) and also as another one of the serial interface lines (line SDAT in this example). The specific arrangement of which serial interface line is shared with which write data line can vary, according to this embodiment of the invention, although it may be preferred that the serial data enable line SDEN not be shared with one of the higher-traffic write data lines WDX, WDY. Serial data enable line SDEN may remain a dedicated signal line, as conventional. Alternatively, in this example and as will be described below, serial data enable line SDEN is shared with fault and BHV line FLT.

Controller 24 also shares these write data lines and terminals with the serial interface, as shown in FIG. 4. In this example, terminal C1 of controller 24 is connected to signal line WDX/SCLK, and is connected both to data channel 60 and to controller circuit 62 within controller 24. Similarly, terminal C2 of controller 24, connected to signal line WDY/SDAT, is also connected to both data channel 60 and to controller circuit 62 within controller 24. Within controller 24 (or externally, if desired), signal lines WDX/SCLK and WDY/SDAT are both connected to one of pull-up resistors 53. The connection between controller circuit 62 and terminals C1, C2 is made through series resistors 55, 57, respectively, as conventional for the serial interface connections.

According to this embodiment of the invention, therefore, serial communications from controller 24 are locked out during write operations, for example during data cycles in which read/write signal line R/xW is asserted to a low state by controller 24. For example, serial interface 50 may receive a signal corresponding to the state of read/write signal line R/xW, so that the state of signal lines signal lines WDX/SCLK and WDY/SDAT is ignored by serial interface 50 during write operations. Similarly, controller circuit 62 in controller 24 comprehends that, according to this embodiment, serial communications are not to be initiated during write operations.

Figure 5A:
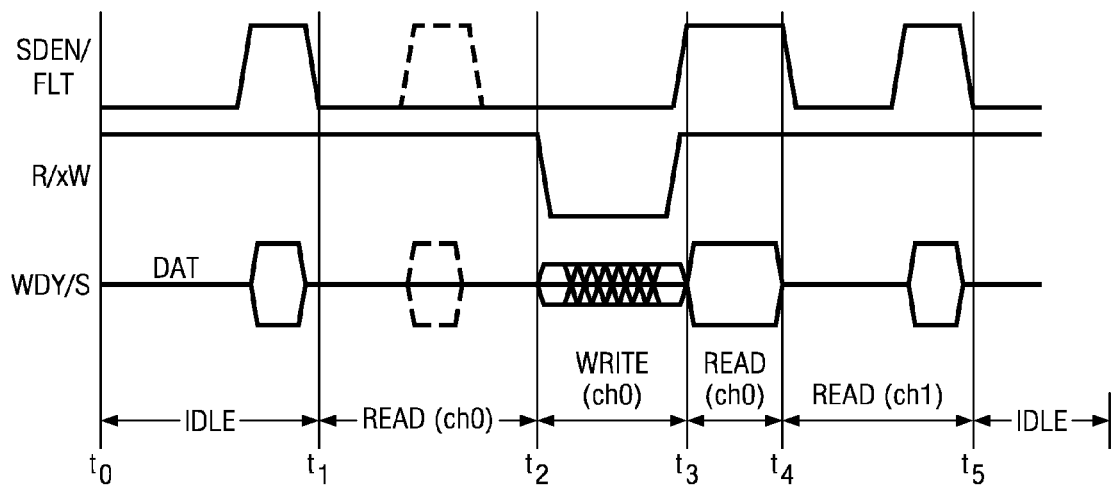
FIGS. 5a and 5b are timing diagrams illustrating the operation of the preamplifier architecture of FIG. 4, according to the first preferred embodiment of the invention.

FIG. 5a illustrates an example of the operation of the architecture of FIG. 4, according to this first preferred embodiment of the invention. Between time $t_0$ and time $t_1$ of this example, preamplifier 20 is in an idle state, in which no data transfer is being carried out. Prior to time $t_1$, controller 24 asserts serial data enable line SDEN (line SDEN/FLT in this example). During such time as serial data enable line SDEN/FLT is at a high, active, level, controller 24 issues control information in the form of serial data signals over signal line WDY/SDAT, in combination with cycles of the serial clock (not shown) on line WDX/SCLK. This control information, in this example, includes selection of read/write head $15_0$ for succeeding operations, along with control signals to initiate read and write operations, depending on the level of read/write control signal R/xW. According to this embodiment of the invention, serial data is communicated and valid during such time as serial data enable line SDEN/FLT is at an active high level, and not otherwise.

Following time $t_1$, preamplifier 20 is in an active state. In this example, because read/write control signal R/xW is at a high level, a read of data sensed by selected read/write head $15_0$ is carried out. Data driver 41 thus drives differential read data lines RDX, RDY with data states corresponding to the sensed data states, and this data is received by data channel 60 of controller 24. Simultaneously with this read data transfer, controller 24 can communicate control information to preamplifier 20 over the serial interface. As shown in FIG. 5a, serial data enable line SDEN/FLT is asserted by controller circuit 62; during the active high duration of serial data enable line SDEN/FLT, controller 24 can issue serial data over serial data line WDY/SDAT, in conjunction with cycles of serial clock signal over line WDX/SCLK. Despite the sharing of these serial communication lines SDEN/FLT, WDX/SCLK, WDY/SDAT, there is no interference between the serial data communication and data transfer, because read/write control signal R/xW maintains the communications as a data read. Controller 24 locks out data write operations as it asserts the low logic level on read/write control line R/xW, preventing interference at terminals P1, P2.

At time $t_2$, controller 24 initiates data write operations to the selected write head (e.g., read/write head $15_0$ in this example), by pulling read/write control signal line R/xW to a low level. During this time, so long as read/write control signal line R/xW is low, serial communications are inhibited. The serial data enable signal line SDEN/FLT remains at a low level (assuming no fault, as will be described in detail below). Signal line WDY/SDAT communicates one side of the differential data driven by data channel 60 in controller 24 (line WDX/SCLK driving the other side) during this write period between time $t_2$ and time $t_3$. Immediately prior to time $t_3$ in this example, read/write control line R/xW is asserted high again, terminating this write operation and freeing lines WDX/SCLK, WDY/SDAT for serial communications, which commence beginning at time $t_3$, with the transmission of serial control information by controller 24 over signal line WDY/SDAT, enabled by an active level on line SDEN/FLT in combination with serial clock cycles (not shown) on signal line WDX/SCLK. Because read/write control signal R/xW is asserted high during this time, no interference between the serial and write operation is caused. In this example, this serial control information includes the selection of read/write head $15_1$ for the sensing of stored data, and its communication to data channel 60 over read data lines RDX, RDY. Conventional read data transfers over lines RDX, RDY can continue during this period, as enabled by read/write control signal R/xW. Toward the end of this period, controller 24 again asserts a high level on line SDEN/FLT, and communications control information corresponding to an idle state over signal line WDY/SDAT. Following time $t_4$, preamplifier 20 enters the idle state, with no data transfer in either the read or write direction.

As mentioned above, the number of external terminals for preamplifier 20 can be further reduced by sharing of the serial data enable and fault indicator signals on a single line SDEN/FLT, as shown in the example of FIG. 4. In this example, this sharing is accomplished by terminal P3 of preamplifier 20 being connected both to FLT/BHV circuit 48 and to serial interface 50. Within controller 24, terminal C3 is connected both to controller circuit 62 (via series resistor 59), and also to fault detection circuit 64. Pull-down resistor 61 is provided within controller 24 (or externally thereto), pulling shared line SDEN/FLT to an inactive low level unless asserted by controller circuit 62 (to effect a serial data transfer) or by FLT/BHV circuit 48, to indicate a fault condition. It is contemplated that the communication of buffered head voltages from read/write heads 15, via the BHV function of FLT/BHV circuit 48, can be carried out in the conventional manner.

Figure 5B:
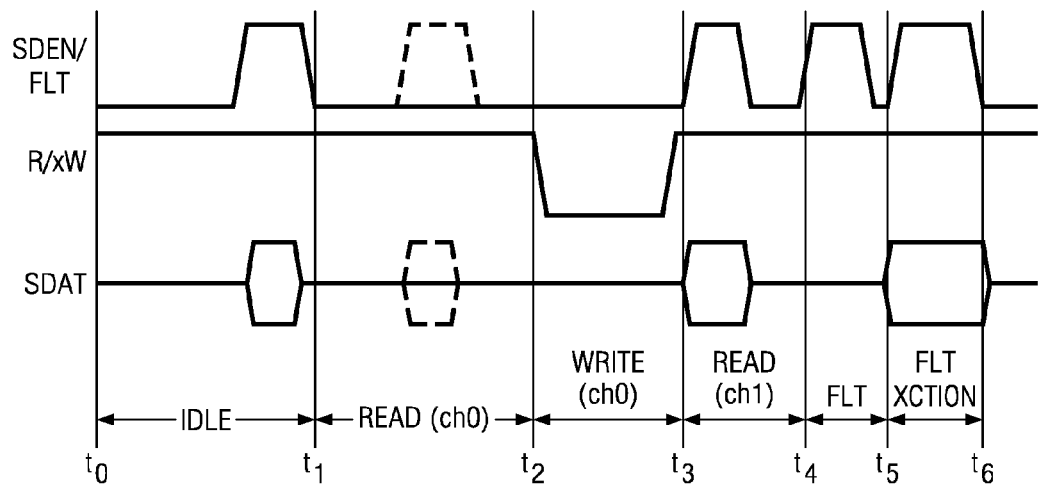

The operation of this example continues as described above, up to time $t_3$ following the end of the write operation to read/write head $15_0$. Following time $t_3$, as before, a read operation from read/write head $15_1$ begins with the communication of serial data over signal line WDY/SDAT, enabled by an active level on line SDEN/FLT in combination with serial clock cycles (not shown) on signal line WDX/SCLK. However, in this example, preamplifier 20 detects a fault condition in connection with the selected read/write head $15_1$ at time $t_4$, and FLT/BHV circuit 48 asserts signal line SDEN/FLT at terminal P3 to an active high level. This asserted state is communicated to fault detection circuit 64, which indicates to controller circuit 62 to begin its fault handling operation. It is preferred that the duration of the high level asserted by FLT/BHV circuit 48 on line SDEN/FLT is limited in time, so that signal line SDEN/FLT is available to receive an active serial data enable signal produced by controller circuit 62, in combination with serial data over line WDY/SDAT (and clock signals over line WDX/SCLK) to control preamplifier 20 to avoid or resolve the fault condition, as shown in FIG. 5$b$ beginning at time $t_5$. Following the serial communication of the fault resolution transaction, at time $t_6$, preamplifier 20 will enter the desired idle or operating state indicated by the serial data transferred during the fault handling transaction between times $t_5$ and $t_6$. Fault detection during write mode is also feasible, in a similar fashion as fault detection during the read mode.

According to this first preferred embodiment of the invention, therefore, the number of external terminals required of a preamplifier in a hard disk drive controller is reduced by two by the sharing of lines of the serial interface with write data terminals, and by another one by the sharing of another line of the serial interface with the fault indicator. This reduction in the number of external terminals, and also in the number of conductor traces required between the preamplifier and the controller function, facilitates the further miniaturization of the disk drive controller function in modern digital systems, and also substantial reduction in cost. Furthermore, the sharing of the serial interface with only the write data signal lines, and not the read data signal lines, permits the parallel communication of control information over the serial interface during read operations, and does not require the entry of the preamplifier and controller into a special serial mode. The operation of the disk drive controller constructed in this manner is thus greatly streamlined over other terminal sharing arrangements.

Figure 6:
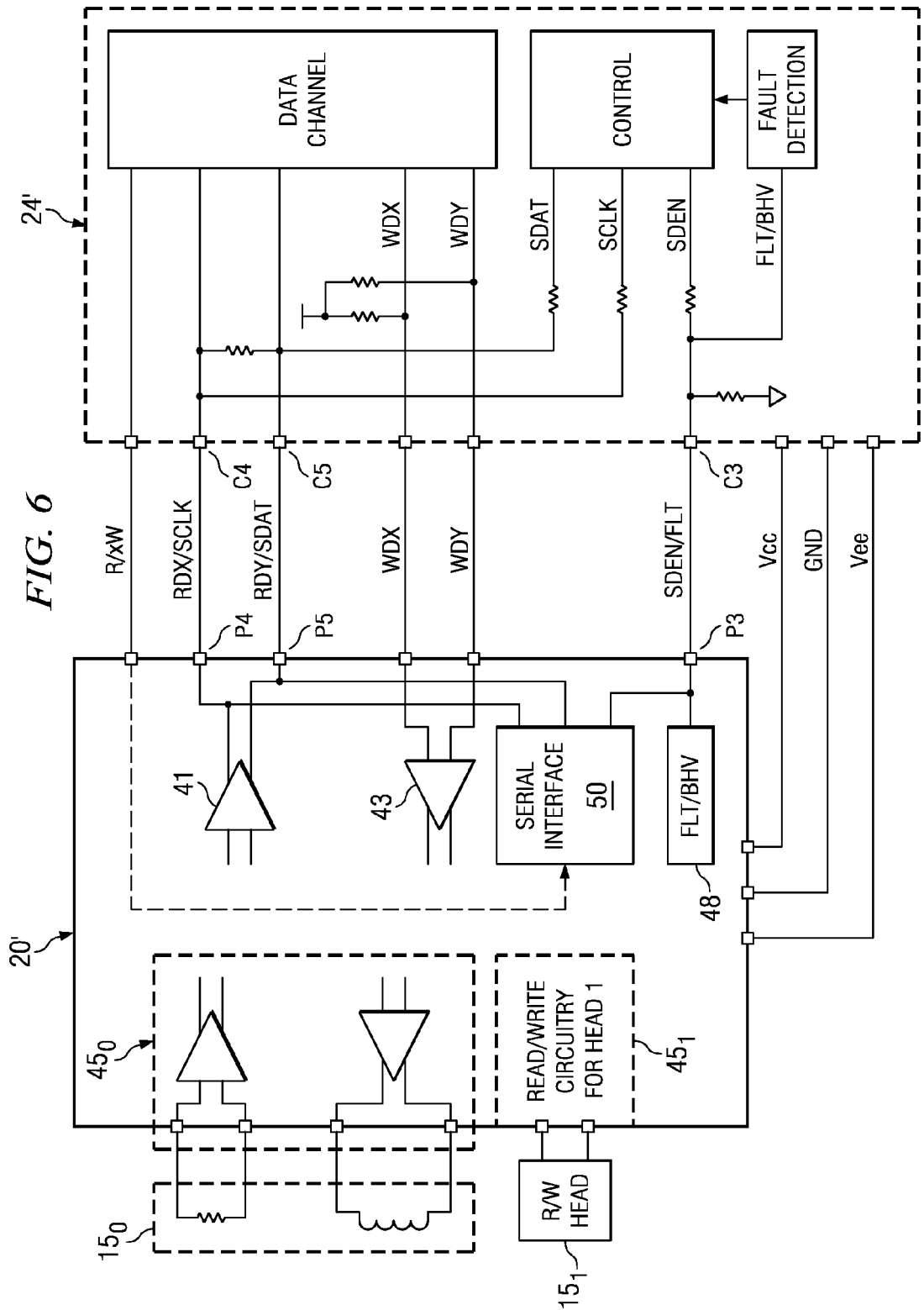
FIG. 6 is an electrical diagram, in block form, of a preamplifier constructed according to a second preferred embodiment of the invention, as connected in a disk drive controller architecture.

Referring now to FIG. 6, the construction of preamplifier 20' and controller 24' in connection with a second preferred embodiment of the invention will now be described. In this second preferred embodiment, the serial interface shares signal lines with the read data lines RDX, RDY, rather than the write data lines as in the previous embodiment. In FIG. 6, those elements that are similar to those in the first embodiment of this invention will be referred to by the same reference numerals, and will not be described again in detail.

According to this second embodiment of the invention, terminals P4 and P5 of preamplifier 20 are shared by the differential outputs of data driver 41 and by the signal lines from controller 24' to serial interface 50. In this example, signal line RDX/SCLK connected to terminal P4 operates as one of the differential read data lines (line RDX in this example), and also as one of the serial interface lines (line SCLK in this example). Signal line RDY/SDAT, connected to terminal P5, operates as the other differential write read line (line RDY in this example) and also as another one of the serial interface lines (line SDAT in this example). Again, the serial interface line shared by signal lines RDX, RDY can vary if desired; however, as mentioned above, the serial data enable line SDEN is preferably not shared with one of the higher-traffic read data lines RDX, RDY. In this example, serial data enable line SDEN is shared with fault and BHV line FLT at terminal P3, as shown in FIG. 4. Alternatively, serial data enable line SDEN may remain a dedicated signal line, at the cost of an additional terminal and conductor trace from that shown.

Controller 24' shares these read data lines and terminals with the serial interface, according to this embodiment of the invention that is shown in FIG. 4. In this example, terminal C4 of controller 24' is connected to signal line RDX/SCLK, and is connected both to data channel 60 and to controller circuit 62 within controller 24'. Similarly, terminal C5 of controller 24' is connected to signal line RDY/SDAT, and to both data channel 60 and to controller circuit 62 within controller 24. The pull-up, pull-down, and series resistors within or external to controller 24' are provided as before.

According to this second preferred embodiment of the invention, therefore, serial communications from controller 24' are locked out during read operations, for example during data cycles in which read/write signal line R/xW is asserted to a high state by controller 24'. For example, serial interface 50 may receive a signal corresponding to the state of read/write signal line R/xW, so that the state of signal lines signal lines RDX/SCLK and RDY/SDAT is ignored by serial interface 50 during read operations. Similarly, controller circuit 62 in controller 24' comprehends that, according to this embodiment, serial communications are not to be initiated during read operations, in this embodiment of the invention.

Figure 7:
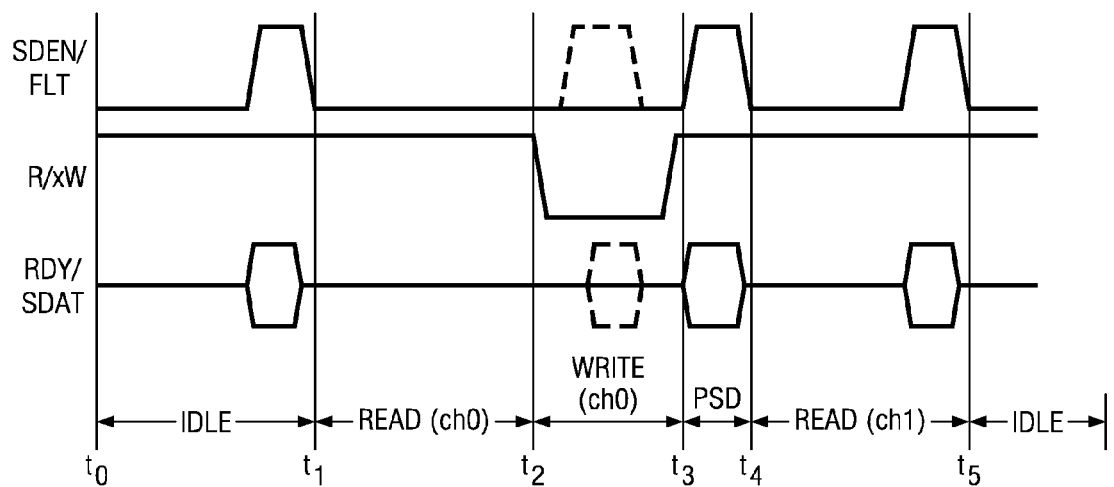
FIG. 7 is a timing diagram illustrating the operation of the preamplifier architecture of FIG. 6, according to the second preferred embodiment of the invention.

FIG. 7 illustrates an example of the operation of the architecture of FIG. 6, according to this second preferred embodiment of the invention. As in the example illustrated in FIG. 5$a$, preamplifier 20' is in an idle state between time $t_0$ and time $t_1$, at which time controller 24' asserts serial data enable line SDEN/FLT and issues control information in the form of serial data signals over signal line RDY/SDAT, in combination with cycles of the serial clock (not shown) on line RDX/SCLK, to initiate read/write operations, selecting read/write head $15_0$.

At time $t_1$, read/write control signal R/xW is at a high level, indicating that a read of data sensed by selected read/write head $15_0$ is desired. As described above, according to this second preferred embodiment of the invention, serial communications are locked-out during read operations. As such, between time $t_1$ and time $t_2$, in this example, data driver 41 drives differential read data lines RDX, RDY with data states corresponding to the sensed data states, with this data received by data channel 60 of controller 24'. At time $t_2$, controller 24' initiates data write operations to the selected write head (e.g., read/write head $15_0$ in this example), by pulling read/write control signal line R/xW to a low level.

According to this embodiment of the invention, controller 24' can communicate control information to preamplifier 20' over the serial interface simultaneously with write operations. As shown in FIG. 7, serial data enable line SDEN/FLT is asserted by controller circuit 62 during the write duration following time $t_2$, during which time controller 24' can issue serial data over serial data line RDY/SDAT, in conjunction with cycles of the serial clock signal (not shown) over line RDX/SCLK. Despite the sharing of these serial communication lines SDEN/FLT, RDX/SCLK, RDY/SDAT, there is no interference between the serial data communication and data transfer, because read/write control signal R/xW maintains the communications as a data write, in which case no signals are being driven by data driver 43 via terminals P4, P5. During this time, so long as read/write control signal line R/xW is low, serial communications are inhibited.

According to this embodiment of the invention, controller 24' can assert a serial data enable on shared line SDEN/FLT during read operations, however. In this embodiment of the invention, this serial data enable suspends any read operations that may be in process, with preamplifier 20' resuming the read operations once line SDEN/FLT is released by controller 24'. This situation is shown beginning at time $t_3$ of FIG. 7, with read/write control signal line R/xW being driven high (indicating a read) and line SDEN/FLT then being taken active high. This combination places preamplifier 20' into a special idle state, during which no read operation is performed by preamplifier 20' (and of course no write takes place, because line R/xW is high). Controller 24' is capable of communicating serial data over shared line RDY/SDAT, in combination with serial clock signals (not shown) over line RDX/SCLK. For example, this control information can be used to select read/write head $15_1$ for read and write operations. In this case, upon the cessation of the active high level on line SDEN/FLT (and the release of line RDY/SDAT by controller 24') at time $t_4$, read operations relative to read/write head $15_1$ then resume. This operation continues until shortly before time $t_5$, upon controller 24' asserting a high level on line SDEN/FLT, suspending read operations and permitting controller 24' to assert serial data over shared line RDY/SDAT (and serial clock signals over shared line RDX/SCLK). In this example, the serial data so communicated places preamplifier 20' into an idle state, which commences at time $t_6$ upon release of serial data enable shared line SDEN/FLT.

According to this second embodiment of the invention, the indication and handling of fault conditions is performed substantially the same as described above relative to FIG. 5b. Should a fault occur, whether in a read or a write operation, FLT/BHV circuit 48 will assert an active high level on shared line SDEN/FLT, which will suspend the current operation (read or write). Preferably, the duration of this fault indicator on line SDEN/FLT will be limited, following which controller 24' can assert the serial data enable on the same line, to communicate the necessary information for resolving or otherwise responding to the fault condition. Operation of preamplifier 20' following such fault handling will then again commence.

According to this second preferred embodiment of the invention, as in the first preferred embodiment of the invention described above, the number of external terminals required of a preamplifier in a hard disk drive controller is reduced by two by the sharing of lines of the serial interface with read data terminals, and by another one by the sharing of another line of the serial interface with the fault indicator. This reduction in the number of external terminals and conductor traces facilitates the further miniaturization of the disk drive controller function in modern digital systems, and also substantial reduction in cost. Furthermore, the sharing of the serial interface with only the read data signal lines, and not the write data signal lines, permits the parallel communication of control information over the serial interface during write operations, and does not require the entry of the preamplifier and controller into a special serial mode. The operation of the disk drive controller constructed in this manner is thus greatly streamlined over other terminal sharing arrangements.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A preamplifier for a disk drive controller, comprising:
   read/write circuitry, for coupling to one or more read/write heads;
   a differential data driver, coupled to first and second preamplifier terminals, for presenting differential signals corresponding to sensed data from a selected read/write head;
   a differential data receiver, coupled to third and fourth preamplifier terminals, for receiving differential signals corresponding to data to be written by a selected read/write head; and
   a serial interface, coupled to the either the first and second preamplifier terminals or the third and fourth preamplifier terminals, for receiving serial control signals; and
   a controller for receiving the differential signals on at least two of the preamplifier terminals and for presenting the differential signals on at least two controller terminals.

2. The preamplifier of claim 1, wherein the serial interface is also coupled to receive serial control data signals from a fifth preamplifier terminal.

3. The preamplifier of claim 2, wherein the serial interface receives a serial clock signal at the first preamplifier terminal, receives serial data signals at the second preamplifier terminal, and receives a serial data enable signal at the fifth preamplifier terminal.

4. The preamplifier of claim 2, further comprising:
   fault circuitry, for presenting fault indicator signals at the fifth preamplifier terminal responsive to detecting a fault condition.

5. The preamplifier of claim 1, wherein the serial interface is operable to receive serial control signals simultaneously with the differential data receiver receiving differential signals corresponding to data to be written.

6. A disk drive controller, comprising:
a preamplifier, comprising:
read/write circuitry, for coupling to one or more read/write heads;
a differential data driver, coupled to first and second preamplifier terminals, for presenting differential signals corresponding to sensed data from a selected read/write head;
a differential data receiver, coupled to third and fourth preamplifier terminals, for receiving differential signals corresponding to data to be written by a selected read/write head; and
a serial interface, coupled to the first and second preamplifier terminals, for receiving serial control signals;
a controller, comprising:
data channel circuitry for receiving, at first and second controller terminals, the differential signals from the preamplifier corresponding to sensed data, and for presenting, at third and fourth controller terminals, differential signals corresponding to data to be written; and
controller circuitry, coupled to the first and second controller terminals, for presenting serial control signals to the preamplifier; and
a plurality of conductors, for coupling the first preamplifier terminal to the first controller terminal, for coupling the second preamplifier terminal to the second controller terminal, coupling the third preamplifier terminal to the third controller terminal, and for coupling the fourth preamplifier terminal to the fourth controller terminal.

7. The disk drive controller of claim 6, wherein the serial interface is also coupled to receive serial control data signals from a fifth preamplifier terminal;
wherein the controller circuitry is also for presenting serial control signals to a fifth controller terminal;
and wherein the plurality of conductors are also for coupling the fifth preamplifier terminal to the fifth controller terminal.

8. The disk drive controller of claim 7, wherein the controller circuitry asserts a serial data enable signal at the fifth controller terminal, presents a serial clock signal at the first controller terminal, and presents serial data signals at the second controller terminal synchronous with the serial clock signal.

9. The disk drive controller of claim 7, wherein the preamplifier further comprises:
fault circuitry, for presenting fault indicator signals at the fifth preamplifier terminal responsive to detecting a fault condition;
and wherein, the controller further comprises:
fault detection circuitry, coupled to the fifth preamplifier terminal, for detecting fault indicator signals.

10. The disk drive controller of claim 6, wherein the serial interface is operable to receive serial control signals simultaneously with the differential data receiver receiving differential signals corresponding to data to be written.

11. A disk drive controller, comprising:
a preamplifier, comprising:
read/write circuitry, for coupling to one or more read/write heads;
a differential data driver, coupled to first and second preamplifier terminals, for presenting differential signals corresponding to sensed data from a selected read/write head;
a differential data receiver, coupled to third and fourth preamplifier terminals, for receiving differential signals corresponding to data to be written by a selected read/write head; and
a serial interface, coupled to the third and fourth preamplifier terminals, for receiving serial control signals;
a controller, comprising:
data channel circuitry for receiving, at first and second controller terminals, the differential signals from the preamplifier corresponding to sensed data, and for presenting, at third and fourth controller terminals, differential signals corresponding to data to be written; and
controller circuitry, coupled to the third and fourth controller terminals, for presenting serial control signals to the preamplifier; and
a plurality of conductors, for coupling the first preamplifier terminal to the first controller terminal, for coupling the second preamplifier terminal to the second controller terminal, coupling the third preamplifier terminal to the third controller terminal, and for coupling the fourth preamplifier terminal to the fourth controller terminal.

12. The disk drive controller of claim 11, wherein the serial interface is also coupled to receive serial control data signals from a fifth preamplifier terminal;
wherein the controller circuitry is also for presenting serial control signals to a fifth controller terminal;
and wherein the plurality of conductors are also for coupling the fifth preamplifier terminal to the fifth controller terminal.

13. The disk drive controller of claim 12, wherein the controller circuitry asserts a serial data enable signal at the fifth controller terminal, presents a serial clock signal at the third controller terminal, and presents serial data signals at the fourth controller terminal synchronous with the serial clock signal.

14. The disk drive controller of claim 12, wherein the preamplifier further comprises:
fault circuitry, for presenting fault indicator signals at the fifth preamplifier terminal responsive to detecting a fault condition;
and wherein the controller further comprises:
fault detection circuitry, coupled to the fifth preamplifier terminal, for detecting fault indicator signals.

15. The disk drive controller of claim 11, wherein the serial interface is operable to receive serial control signals simultaneously with the differential data driver presenting differential signals corresponding to sensed data.

16. The preamplifier of claim 1 further comprising: a plurality of conductors, for coupling the first preamplifier terminal to a first controller terminal, for coupling the second preamplifier terminal to a second controller terminal, coupling the third preamplifier terminal to a third controller terminal, and for coupling the fourth preamplifier terminal to a fourth controller terminal.

* * * * *